United States Patent
Chaturvedi et al.

(10) Patent No.: US 8,966,082 B2
(45) Date of Patent: *Feb. 24, 2015

(54) VIRTUAL MACHINE ADDRESS MANAGEMENT

(75) Inventors: Pradeep Kumar Chaturvedi, Bangalore (IN); Prem Sankar Gopannan, Venkata Nagar (IN)

(73) Assignee: Novell, Inc., Provo, UT (US)

(*) Notice: Subject to any disclaimer, the term of this patent is extended or adjusted under 35 U.S.C. 154(b) by 1069 days.

This patent is subject to a terminal disclaimer.

(21) Appl. No.: 12/368,489

(22) Filed: Feb. 10, 2009

(65) Prior Publication Data

US 2010/0205304 A1 Aug. 12, 2010

(51) Int. Cl.
G06F 15/173 (2006.01)

(52) U.S. Cl.
USPC .......................................................... 709/226

(58) Field of Classification Search
CPC ...................... H04L 61/2015; H04L 29/12839; H04L 67/10; G06F 9/5077
USPC .......................................................... 709/225
See application file for complete search history.

(56) References Cited

U.S. PATENT DOCUMENTS

| | | | |
|---|---|---|---|
| 7,577,722 B1 * | 8/2009 | Khandekar et al. ............ | 709/220 |
| 7,802,000 B1 * | 9/2010 | Huang et al. .................. | 709/228 |
| 8,595,361 B2 | 11/2013 | Chaturvedi et al. | |
| 2002/0013802 A1 | 1/2002 | Mori et al. | |
| 2003/0115344 A1 * | 6/2003 | Tang et al. ..................... | 709/229 |
| 2004/0019565 A1 | 1/2004 | Goringe et al. | |
| 2005/0132367 A1 * | 6/2005 | Tewari et al. .................... | 718/1 |
| 2005/0198303 A1 | 9/2005 | Knauerhase et al. | |
| 2006/0004667 A1 | 1/2006 | Neil | |
| 2006/0161652 A1 * | 7/2006 | Takizawa et al. ............. | 709/224 |
| 2007/0002761 A1 * | 1/2007 | Diamant et al. .............. | 370/252 |
| 2007/0064661 A1 | 3/2007 | Sood et al. | |
| 2007/0162594 A1 * | 7/2007 | Henry et al. .................. | 709/224 |
| 2007/0180120 A1 * | 8/2007 | Bainbridge et al. .......... | 709/226 |
| 2008/0028071 A1 | 1/2008 | Miyajima | |
| 2008/0046680 A1 | 2/2008 | Nagata et al. | |
| 2008/0098465 A1 | 4/2008 | Ramakrishna et al. | |

(Continued)

FOREIGN PATENT DOCUMENTS

EP 1612642 A2 1/2006

OTHER PUBLICATIONS

Citrix, XenServer Virtual Machine Installation Guide, Published Sep. 2008, 1.0 Edition.*

(Continued)

*Primary Examiner* — Sulaiman Nooristany
(74) *Attorney, Agent, or Firm* — Schwegman Lundberg & Woessner, P.A.

(57) ABSTRACT

Apparatus, systems, and methods may operate to receive reports at a server node, the reports indicating a change in virtual machine status for virtual machines hosted on a virtual machine host node; and to allocate/de-allocate addresses to the virtual machines based on the change in virtual machine status and one or more policies. Some embodiments may operate to detect, at a virtual machine host node, a change in virtual machine status for virtual machines hosted on the host node; and to transmit reports to a server node from the host node, the reports indicating the change in virtual machine status, to enable the server node to allocate/de-allocate addresses to the virtual machines based on the change in virtual machine status and one or more policies. Additional apparatus, systems, and methods are disclosed.

24 Claims, 4 Drawing Sheets

(56) References Cited

U.S. PATENT DOCUMENTS

| | | | |
|---|---|---|---|
| 2008/0134177 | A1 | 6/2008 | Fitzgerald et al. |
| 2008/0183626 | A1 | 7/2008 | Romero et al. |
| 2008/0244579 | A1 | 10/2008 | Muller |
| 2008/0250407 | A1 | 10/2008 | Dadhia et al. |
| 2009/0144510 | A1 | 6/2009 | Wibling et al. |
| 2010/0132011 | A1 | 5/2010 | Morris et al. |
| 2010/0205303 | A1 | 8/2010 | Chaturvedi et al. |

OTHER PUBLICATIONS

"European Application Serial No. 10153097.0, European Search Report mailed Jul. 5, 2010", 6 Pgs.

"U.S. Appl. No. 12/368,438, Final Office Action mailed Feb. 7, 2011", 15 pgs.

"U.S. Appl. No. 12/368,438, Response filed Apr. 6, 2011 to Final Office Action mailed Feb. 7, 2011", 12 pgs.

"European Application Serial No. 10153096.3, Examination Notification Art. 94(3) mailed Oct. 12, 2010", 5 pgs.

"U.S. Appl. No. 12/368,438 , Response filed Jun. 25, 2013 to Final Office Action mailed Apr. 25, 2013", 13 pgs.

"U.S. Appl. No. 12/368,438, Advisory Action mailed Apr. 20, 2011", 3 pgs.

"U.S. Appl. No. 12/368,438, Final Office Action mailed Apr. 25, 2013", 16 pgs.

"U.S. Appl. No. 12/368,438, Non Final Office Action mailed Apr. 12, 2012", 15 pgs.

"U.S. Appl. No. 12/368,438, Non Final Office Action mailed Oct. 1, 2012", 15 pgs.

"U.S. Appl. No. 12/368,438, Notice of Allowance mailed Jul. 24, 2013", 8 pgs.

"U.S. Appl. No. 12/368,438, Response filed Jul. 11, 2012 to Non Final Office Action mailed Apr. 12, 2012", 10 pgs.

"U.S. Appl. No. 12/368,438, Response filed Dec. 20, 2012 to Non Final Office Action mailed Oct. 1, 2012", 12 pgs.

"European Application Serial No. 10153096.2, Amendment filed Aug. 24, 2010", 7 pgs.

"European Application Serial No. 10153096.2, Decision to Refuse mailed Dec. 10, 2012", 7 pgs.

"European Application Serial No. 10153096.2, Extended European Search Report mailed Apr. 23, 2010", 6 pgs.

"European Application Serial No. 10153096.2, Notice of Appeal mailed Feb. 20, 2013", 2 pgs.

"European Application Serial No. 10153096.2, Provision of the Minutes mailed Dec. 6, 2012", 11 pgs.

"European Application Serial No. 10153096.2, Response filed Feb. 2, 2011 to Office Action mailed Oct. 12, 2010", 6 pgs.

"European Application Serial No. 10153096.2, Result of Consultation mailed Oct. 11, 2012", 6 pgs.

"European Application Serial No. 10153096.2, Statement of Grounds of Appeal mailed Apr. 8, 2013", 16 pgs.

"European Application Serial No. 10153096.2, Summons to Attend Oral Proceedings mailed Aug. 1, 2012", 6 pgs.

"European Application Serial No. 10153096.2, Written Submissions filed Sep. 26, 2012", 4 pgs.

"European Application Serial No. 10153097.0, EPO Written Decision to Refuse mailed Mar. 25, 2014", 12 pgs.

\* cited by examiner

VIRTUAL MACHINE ADDRESS MANAGEMENT

CROSS-REFERENCE TO RELATED APPLICATIONS

This application is related to co-pending and commonly-assigned U.S. patent application Ser. No. 12/368,438, titled "VIRTUAL MACHINE SOFTWARE LICENSE MANAGEMENT," filed on even date herewith and incorporated herein by reference in its entirety.

BACKGROUND

The Dynamic Host Configuration Protocol (DHCP) can be used to assign internet protocol (IP) addresses, subnet masks, default gateways, and other IP configuration parameters. DHCP-configured clients can connect to a network and broadcast a request to a DHCP server, which manages a pool of IP addresses and information about client configuration as part of this process.

DHCP provides several modes for allocating IP addresses, including the well-known dynamic mode. In this mode, upon receipt of a valid request, the server can allocate an IP address and assign a lease (the length of time for which the allocation is valid) to the client. Thus, the client is "leased" an IP address for a period of time, generally ranging from hours to months. In this way, the DHCP server can automatically allocate IP addresses via the lease mechanism, and then maintain a mapping between the client media access control (MAC) address and the allocated IP addresses. The lease mechanism is meant to prevent allocation of IP addresses to machines that are no longer in the network.

When an IP address allocation request is received, the DHCP server doesn't know whether the request comes from a physical machine, or a virtual machine (VM), which can be created and destroyed at will. This can sometimes lead to erratic address management behavior, since the DHCP server is generally unaware of VM life cycle events. For example, when a VM is repeatedly cloned, a new IP address may be assigned to each clone, even when such cloning is unauthorized. Further, when a VM is destroyed, the DHCP server may permit the allocated IP address to remain allocated long past the time of the destruction. Thus, in a virtualized environment, IP address management can be problematic.

SUMMARY

In various embodiments, apparatus, systems, and methods that support VM address management, including IP address management, are provided. For example, in some embodiments, such management is enabled by receiving reports at a server node, the reports indicating a change in VM status for VMs hosted on a VM host node; and allocating/de-allocating addresses to the VMs based on the change in VM status and one or more policies.

Some embodiments may operate to detect, at a VM host node, the change in VM status for VMs hosted on the host node; and to transmit reports to a server node from the host node, the reports indicating the change in VM status, which enable the server node to allocate/de-allocate addresses to the VMs based on the change in VM status and one or more policies. Additional embodiments are described, and along with the foregoing examples, will be set forth in detail below.

DETAILED DESCRIPTION

Figure 1:
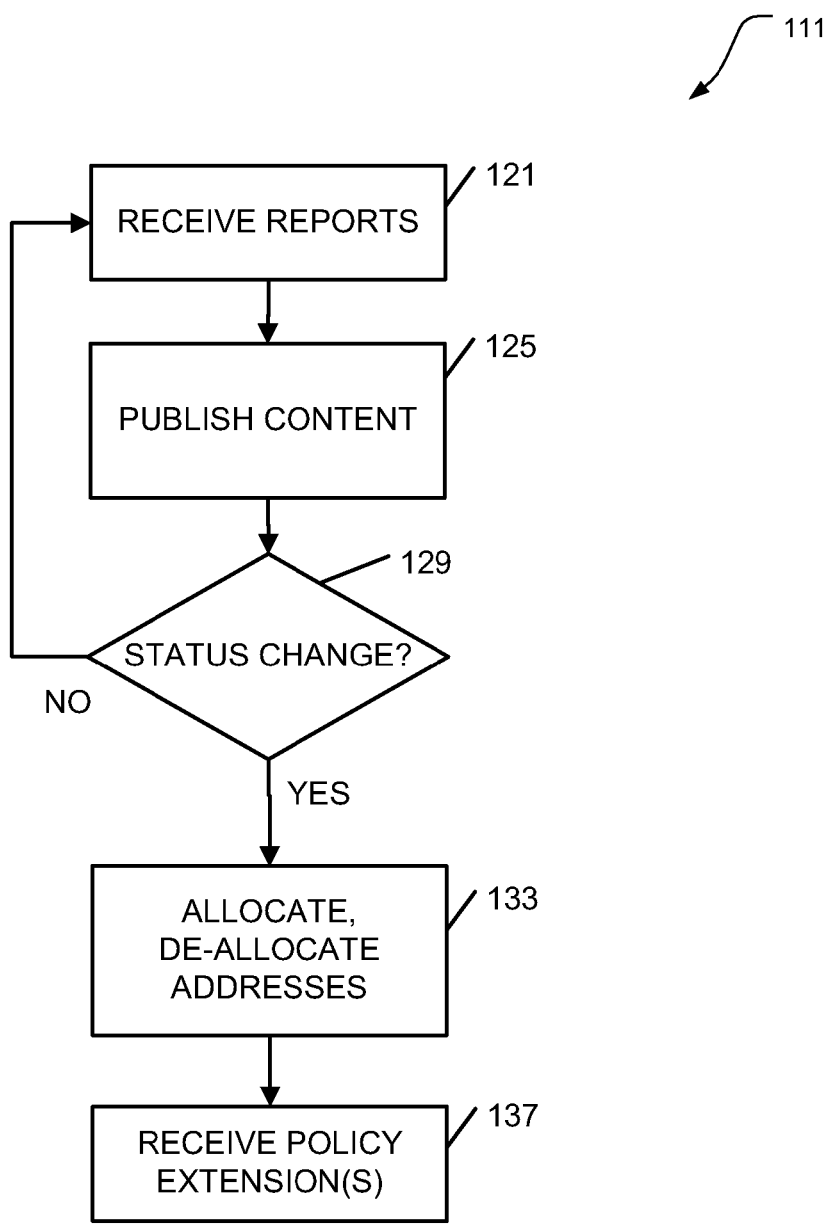
FIG. 1 is a flow diagram illustrating VM address management methods according to various embodiments of the invention.

Some of the challenges described above may be resolved by improving the operation of the DHCP server address lease mechanism within a virtualized environment. For example, in some embodiments, a pair of agents, one residing on a VM host, and another one on a DHCP server, may operate to communicate the status of VMs on the host between themselves. One or more policies can be used to direct how addresses are allocated, based on the VM status.

For example, when some selected number of VMs have been created at a single VM host, the future allocation of IP addresses to newly-created VMs on that host can be restricted (e.g., when a rogue administrator attempts to create VMs that request address allocation until the pool of addresses is exhausted). Similarly, when a VM is cloned, a new IP address can be allocated to a clone, if authorized. Further, IP addresses can be denied to allocation requests associated with MAC addresses that are not valid for a particular network. Finally, when the DHCP server learns that a VM has been destroyed, the IP address allocated to the destroyed VM can be taken back and re-allocated immediately. These are just a few examples of many such policies that can be put in place.

In this way, operations of the DHCP server can be enhanced to support events that make up the VM lifecycle, such as VM creation, cloning, and destruction, as well as VM activity suspension, pausing, and resumption. In addition, policies can be devised by the DHCP administrator to define IP address allocation rules for VMs based on VM host operations and VM life cycle events.

To realize this type of operation, in some embodiments, a notifier module may be added to the DHCP client on a VM host. This client-side agent can be installed along with the DHCP client, to add functionality to the DHCP client. The notifier module is aware of hosted VM life cycle events, and sends periodic notifications of the state, or perhaps changes in state, of each VM to the DHCP server. The notifications can be sent to the DHCP server, along with the VM universally unique identifier (UUID) and/or MAC address. Lease messages can be modified to include the notifications, if desired.

For example, a hypervisor can be modified to render VM state change information directly, or an application can be created to register with the hypervisor to obtain VM state change information. Thus, a hypervisor can provide Common Information Model (CIM)-based notification of changes in VM state, such as creation of a new VM on the VM host, cloning of the VM, and destruction of the VM, etc. It is also possible to create a customized CIM state change notifier module for use on a VM host to transmit VM state change notifications obtained from a standard (i.e., unmodified) hypervisor. Such customized CIM notifier modules can be installed as part of a DHCP client on a VM host machine, and operate to register with the standard hypervisor to provide notifications of VM state change events.

A state change receiver module can be added to the DHCP server as an agent to receive the notifications provided by the CIM notifier module. The receiver module may be configured to receive details regarding a particular VM (e.g., the UUID and MAC address) as well as state information and/or state transition information. Depending upon the implementation, additional information can be transmitted to the DHCP server from the DHCP client, such as details regarding the DHCP host and/or VM IP configuration.

The state change receiver module may be configured to call a lease module. Details of the VM state, or change in state, can be passed to the lease module. The lease module can operate to search for policies related to a particular VM state, and in this way, operations of the DHCP lease module can be modified according to the change in state for one or more VMs. For example, the lease module may operate to release an allocated IP address if the address is associated with a VM that has been destroyed.

A DHCP administrator can use DHCP policy extensions to define policies that are effective within a virtual environment. For example, the administrator can define a policy that will not to accept an IP address allocation request coming from a VM created on a particular host. This might be accomplished by determining that there is a difference between and MAC address reported by the VM host, and the MAC address reported by the VM on the host.

Thus, many embodiments of the invention may be realized, and each can be implemented in a variety of architectural platforms, along with various operating and server systems, devices, and applications. Any particular architectural layout or implementation presented herein is thus provided for purposes of illustration and comprehension only, and is not intended to limit the various embodiments.

FIG. 1 is a flow diagram illustrating VM address management methods 111 according to various embodiments of the invention. The methods 111 are implemented in a machine-accessible and readable medium. The address management methods 111 are operational over processes within and among networks. The networks may be wired, wireless, or a combination of wired and wireless. The methods 111 may be implemented as instructions, which when accessed by a machine, perform the processing depicted in FIG. 1. Given this context, VM address management is now discussed with reference to FIG. 1.

In some embodiments, a computer-implemented method of managing VM address allocation from a server node may begin at block 121 with receiving reports at the server node, the reports indicating a change in VM status for VMs hosted on a VM host node. The reports may comprise the identity of one or more of the VMs, and the state of the identified VMs, among other information. Identification of the VMs can be accomplished by using the MAC address, the UUID, or some other identification information. Thus, the identity may comprise one or more of a MAC address and/or UUID.

Content from the reports can be published, perhaps by transmitting them to another location, or displaying them on a display. Thus, the method 111 may continue on to block 125 to include publishing content from the reports, perhaps to a system administrator (display or printer).

The method 111 may continue on to block 129 to include determining whether a change in VM status has occurred. The change in VM status can be indicated directly (e.g., a change as such), or indirectly, so that the server node operates to combine the present state information, along with prior state information, to determine that a change has occurred. For example, each time a change occurs, the new status can be reported as a changed status, so that the server node can act immediately on the change information. Alternatively, the VM status can be reported to the server node periodically, whether a change has occurred or not, and the server node can operate to compare the current report to a prior report to determine whether any change in status has occurred. Thus, the change in VM status can be determined directly from a single one of the reports, or indirectly from multiple ones of the reports. If no change has occurred, the method 111 may loop back to block 121 to receive further reports.

If a change in VM status has occurred, as determine at block 129, then the method 111 may go on to block 133 to include allocating or de-allocating addresses, such as IP addresses, to the VMs based on the change in VM status and one or more policies. Thus, taken altogether, the method 111 may encompass address management operations as viewed from the server side: reports on the status of VMs on a host node are received at a server node, with addresses allocated and de-allocated to the VMs according to their status and at least one policy.

A leasing module can be called to allocate/de-allocate addresses, and may refer to the policy on the server node. Thus, allocating at block 133 may comprise calling a leasing module that refers to one or more policies to determine whether allocating, de-allocating, or both, are to occur with respect to some set of VMs on the host node. One or more of the policies may include restrictions on allocation based on life cycle events associated with the VMs. Such life cycle events may comprise one or more of: creation, destruction, cloning, suspension, resumption, or pausing. For example, allocation of IP addresses can be denied according to the policy, such as when the MAC address of a requesting VM is not valid within the server network, or when the VM host has requested more than some selected threshold number of addresses over a selected period of time, or when the requested addresses are within a restricted range. Thus, in some embodiments, allocating comprises denying allocation of at least one of the addresses.

As noted previously, policies can be extended by the system administrator. Thus, the method 111 may further include receiving extensions to one or more policies as definitions provided by a system administrator, at block 137. Other embodiments may be realized.

Figure 2:
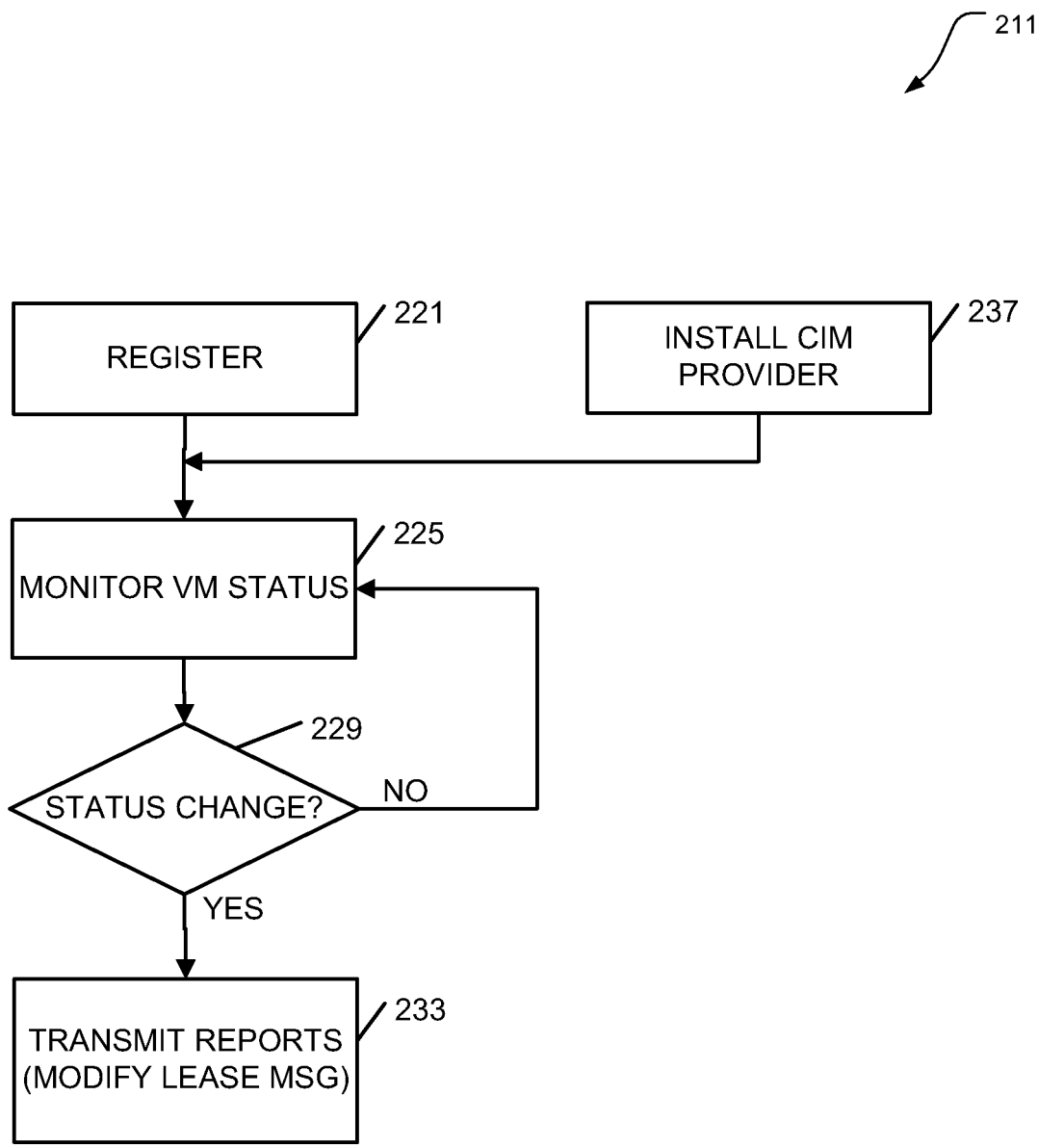
FIG. 2 is another flow diagram illustrating VM address management methods according to various embodiments of the invention.

For example, FIG. 2 is another flow diagram illustrating VM address management methods 211 according to various embodiments of the invention. In this case, VM address management is described with increased emphasis on host node operations. The methods 211 are implemented in a machine-accessible and readable medium, and are operational over processes within and among networks. The networks may be wired, wireless, or a combination of wired and wireless. The methods 211 may be implemented as instructions, which when accessed by a machine, perform the processing depicted in FIG. 2.

To implement VM address management from a host node, for example, a method 211 may begin by registering, perhaps using a VM state change notifier module, with a hypervisor operating on the host node to receive status for one or more VMs at block 221. For example, an add-on module can operate to register with the host node hypervisor to obtain VM status information.

In some embodiments, a CIM provider module can be used to generate the reports, and installed as part of a DHCP client on the host node. Thus, the method 211 may begin at block 237 with installing a CIM provider module as part of a DHCP client on the host node, the CIM provider module to generate the reports. In some cases, the CIM provider module can be used as it is provided by the manufacturer. In others, the CIM provider module can be supplied as a customized version of a manufactured CIM provider module, or even a set of instructions created from scratch and constructed to provide the CIM provider module functionality described herein.

The method 211 may continue on to block 225 with monitoring VM status, to detect changes at block 229. If no changes in VM status are detected, the method 211 may loop back to block 225 to continue monitoring the VM status.

If a change in VM status is detected at block 229, such as by detecting, at a VM host node, a change in VM status for VMs hosted on the host node, then the method 211 may continue on to block 233 with transmitting reports to a server node from the host node. The reports may indicate the change in VM status, and enable the server node to allocate or de-allocate internet protocol addresses to the VMs based on the change in VM status and one or more policies.

The reports may comprise one or more of a status, or a change in status, of at least one of the VMs. The reports may also include a MAC address and/or a UUID of the VMs, to identify the VMs with which they are associated.

The information in the reports can be obtained by registering with a hypervisor, or by monitoring VM operations directly. Thus, the activity of transmitting at block 233 may comprise transmitting the reports from a VM state change notifier module residing on the host node, to a VM state change receiver module residing on the server node. Alternatively, the activity of transmitting at block 233 may comprise transmitting the reports directly from a hypervisor operating on the host node. In this way, a hypervisor that monitors operations of the VMs can transmit the reports to the server node directly, without using an add-on module.

In some embodiments, lease messages can be modified by the DHCP host to include VM status information, and then sent on to the server node for processing. Thus, the activity at block 233 may include modifying a lease message to include one or more of the reports.

The methods of managing addresses shown in FIGS. 1 and 2 can be implemented in a computer-readable storage medium, where the methods are adapted to be executed by a processor. Further details of such embodiments will be provided below.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

Figure 3:
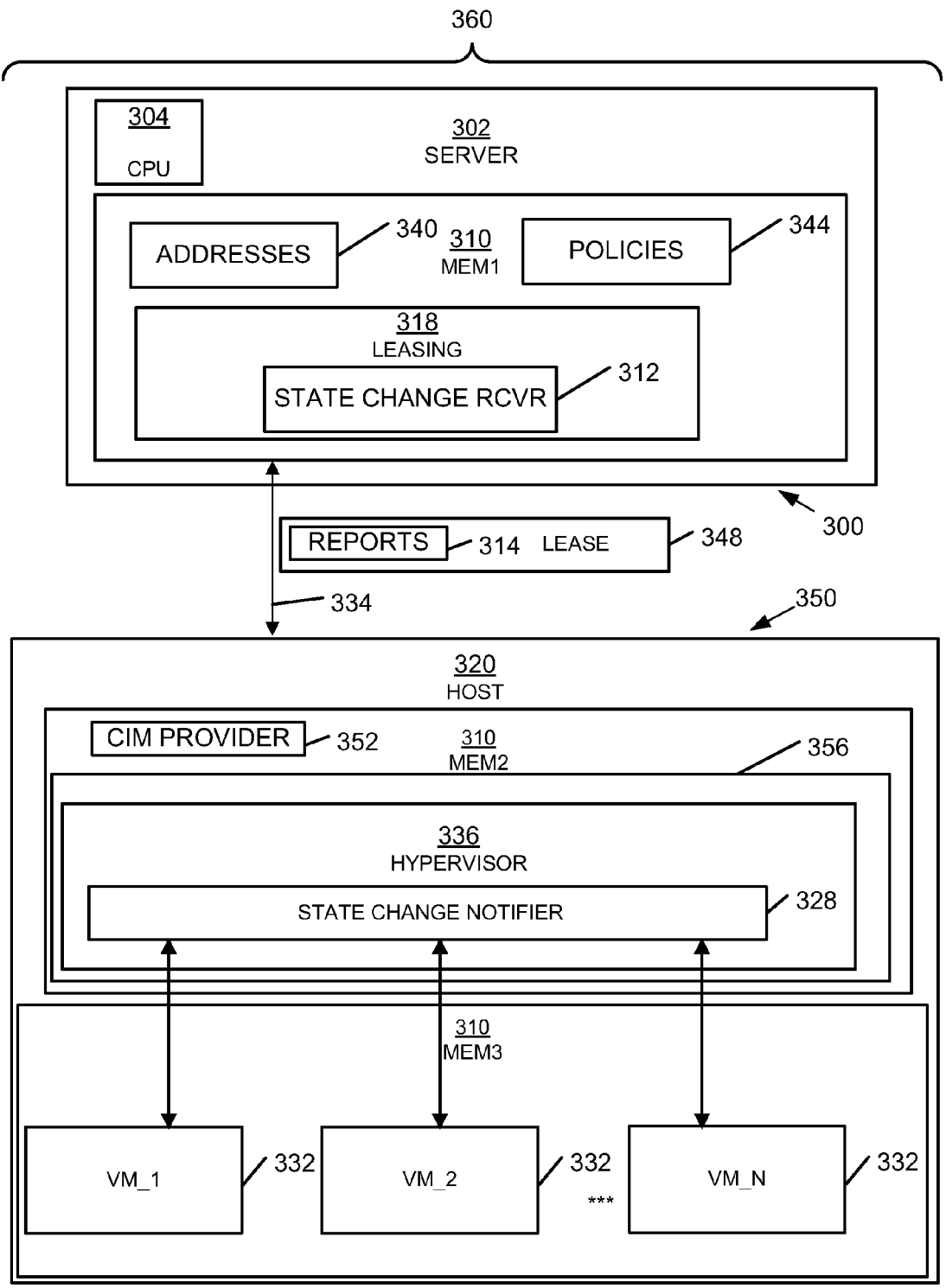
FIG. 3 is a block diagram of VM address management apparatus and systems according to various embodiments of the invention.

For example, FIG. 3 is a block diagram of VM address management apparatus 300, 350 and systems 360 according to various embodiments of the invention.

Here it can be seen that an apparatus 300 used to implement VM address management may comprise a server node 302 and a VM state change receiver module 312 to receive reports 314 at the server node 302. The reports 314 may include any of the content described previously with respect to the VMs 332, a hypervisor module 336, or the host node 302, to assist in allocating addresses 340, such as IP addresses, according to one or more policies 344. The apparatus 300 might comprise a virtual server, for example.

The server node 302 may comprise a DHCP server node, so that the apparatus 300 operates as a DHCP server. The VM state change receiver module 312 may form part of a leasing module 318 to receive the reports 314 as part of leasing messages 348 transmitted from the host node 320 to the server node 302. Thus, the reports 314 can be embedded in leasing messages 348 that are sent from the host node 320 to the server node 302. Further embodiments may be realized.

For example, an apparatus 350 may comprise a VM host node 320 to host a plurality of VMs 332. The apparatus may also comprise a VM state change notifier module 328 to detect, at the VM host node 320, a change in VM status for the VMs 332, and to transmit reports 314 to the server node 302, the reports 314 indicating the change in VM status, thus enabling the server node 302 to allocate or de-allocate addresses 340 to the VMs 332 based on the change in VM status and one or more policies 344. The apparatus 350 may comprise a client node, for example.

The VM state change notifier module 328 may form part of a hypervisor module 336 to monitor operations of the VMs 332 on the VM host node 320. Thus, the hypervisor module 336 can be modified to include the functions of the VM state change notifier module 328.

In some embodiments, the VM Host node 320 comprises a CIM provider module 352. The CIM provider module 352 can be communicatively coupled to receive updates from the change notifier module 328 using internal messaging and/or events. The state change notifier module 328 may operate as part of a DHCP client 356 on the host node 320, and the CIM provider module 352 may operate to generate the reports 314. In this way, the CIM provider module 352 may also operate to obtain information to be included in the reports 314 using the CIM protocol.

The VM address management apparatus 300, 350 may be implemented in a machine-accessible and readable medium that is operational over one or more networks (e.g., comprising path 334). The networks may be wired, wireless, or a combination of wired and wireless. The VM address management apparatus 300, 350 implement, among other things, the processing associated with the methods 111 and 211 of FIGS. 1 and 2, respectively. Modules may comprise hardware, software, and firmware, or any combination of these.

Additional embodiments may be realized. For example, it can be seen that a forced answer communications system 360 may comprises multiple instances of each one of the apparatus 300, 350. Still further embodiments may be realized.

Figure 4:
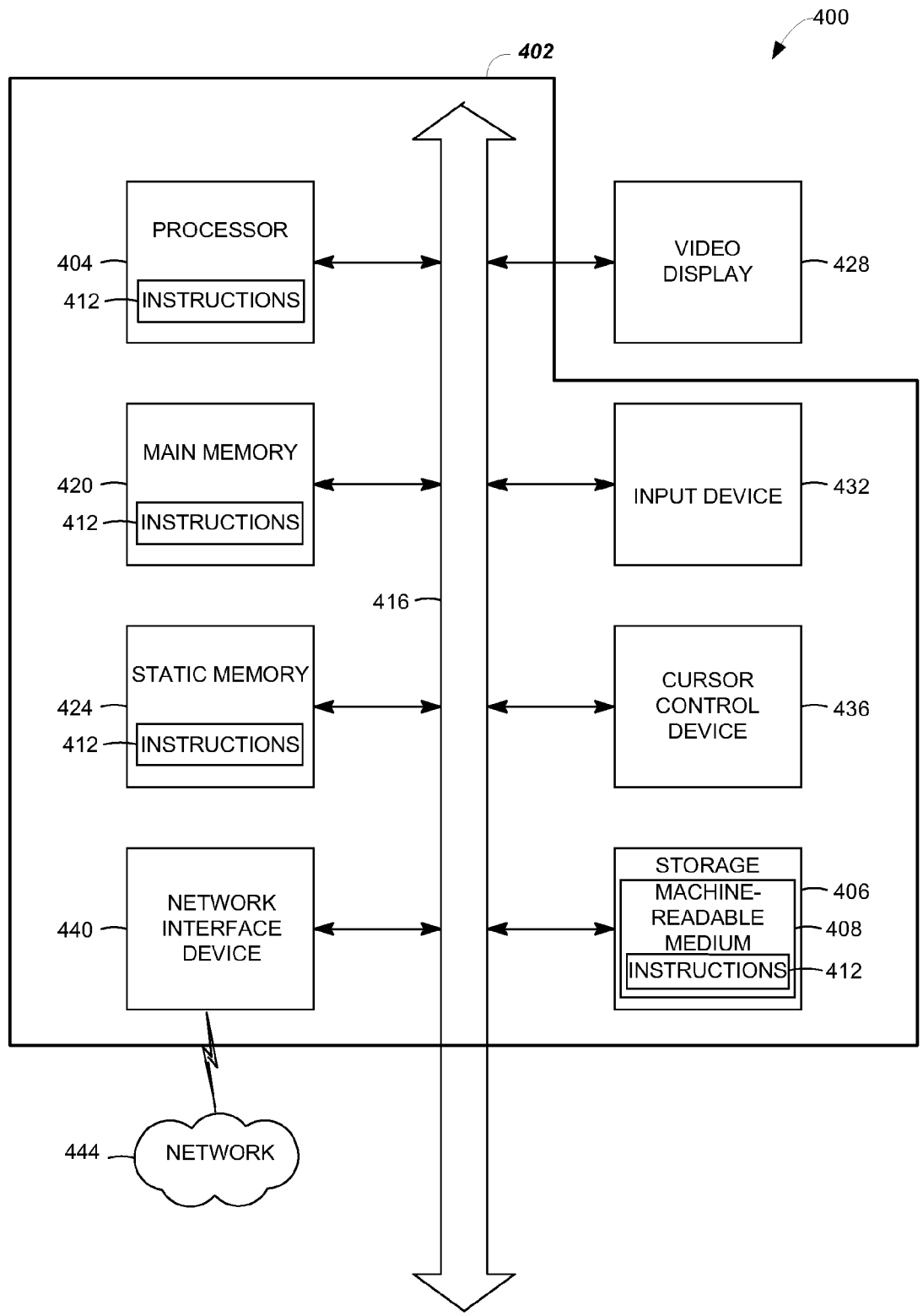
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300, 350 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any machine capable of executing a set of instructions (sequential or otherwise) that specify actions to be taken by that machine. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the various embodiments of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to make a DHCP server aware of VM lifecycle events, so that more effective IP address management can occur, perhaps using a DHCP client as a proxy. Policies can be defined by a DHCP administrator to regulate the allocation of IP addresses in a virtual environment, with the option of using VM UUIDs in association with the allocated addresses. More efficient allocation of addresses, along with greater network security, may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a server node; and
a virtual machine state change receiver module to receive reports at the server node, the reports indicating a change in virtual machine status for virtual machines hosted on a virtual machine host node, the change in virtual machine status including at least one of virtual machine creation, virtual machine cloning, virtual machine destruction, virtual machine suspension, virtual machine pausing, or virtual machine resumption, the server node to allocate or de-allocate interact protocol (IP) addresses to the virtual machines based on the change in virtual machine stares as determined by the reports and at least one policy previously stored in the sever node, the at least one policy including a lifecycle-event based restriction to be used to determine whether to allocate a new IP address to a cloned virtual machine;
wherein the reports comprise: at least one of a status or a change in stares of at least one of the virtual machines, and at least one of a media access control (MAC) address or a universally unique identifier (UUID) of the at least one of the virtual machines.

2. The apparatus of claim 1, wherein the server node comprises a dynamic host configuration protocol (DHCP) server node.

3. The apparatus of claim 1, wherein the virtual machine state change receiver module forms part of a leasing module to receive the reports as part of leasing messages transmitted from the host node to the server node.

4. An apparatus, comprising:
a virtual machine host node to host a plurality of virtual machines; and
a virtual machine state change notifier module to:
detect, at the virtual machine host node, a change in virtual machine status for the virtual machines, the change in virtual machine status including at least one of virtual machine creation, virtual machine cloning, virtual machine destruction, virtual machine suspension, virtual machine pausing, or virtual machine resumption: and
transmit reports to a server node, the reports indicating the change in virtual machine status, to enable the server node to allocate or de-allocate internet protocol (IP) addresses to the virtual machines based on the change in virtual machine status as determined by the reports and at least one policy previously stored in the server node the at least one policy including a lifecycle-event based restriction to be used to determine whether to allocate a new IP address to a cloned virtual machine;
wherein the reports comprise: at least one of a status or a change in stares of at least one of the virtual machines, and at least one of a media access control (MAC) address or a universally unique identifier (UUID) of the at least one of the virtual machines.

5. The apparatus of claim 4, wherein the virtual machine state change notifier module forms part of a hypervisor module to monitor operations of the virtual machines on the virtual machine host node.

6. The apparatus of claim 4, wherein the virtual machine state change notifier module can be coupled to a Common Information Model (CIM) provider module as part of a dynamic host configuration protocol (DHCP) client on the host node, the CIM provider module to generate the reports.

7. A method of managing internet protocol addresses implemented in a non-transitory computer-readable storage medium and adapted to be executed by a processor for performing the method, comprising:
receiving reports at a server node, the reports indicating a change in virtual machine status for virtual machines hosted on a virtual machine host node, the change in virtual machine status including at least one of virtual machine creation, virtual machine cloning, virtual machine destruction, virtual machine suspension, virtual machine pausing, or virtual machine resumption; and
allocating or de-allocating the internet protocol (IP) addresses to the virtual machines based on the change in virtual machine status as determined by the reports and at least one policy previously stored in the server node, the at least one policy including a lifecycle-event based restriction to be used to determine whether to allocate a new IP address to a cloned virtual machine;
wherein the reports comprise: at least one of a status or a change in stares of at least one of the virtual machines, and at least one of a media access control (MAC) address or a universally unique identifier (UUID) of the at least one of the virtual machines.

8. The method of claim 7, wherein the allocating comprises:
calling a leasing module that refers to the at least one policy to determine the allocating or the de-allocating.

9. The method of claim 7, wherein the life cycle events comprise at least one of creation, destruction, cloning, suspension, resumption, or pausing.

10. The method of claim 7, wherein the change in virtual machine status is determined directly from a single one of the reports.

11. The method of claim 7, wherein the change in virtual machine status is determined indirectly from multiple ones of the reports.

12. The method of claim 7, wherein the allocating comprises:
denying allocation of at least one of the internet protocol addresses.

13. The method of claim 7, further comprising:
receiving extensions to the at least one policy as definitions provided by a system administrator.

14. The method of claim 7, further comprising:
publishing content from the reports to a system administrator.

15. The method of claim 7, wherein the reports comprise:
at least an identity of at least one of the virtual machines, and a state of the at least one of the virtual machines.

16. The method of claim 15, wherein the identity comprises:
at least one of a media access control (MAC) address or a universally unique identifier (UUID).

17. A method of managing internet protocol addresses implemented in a non-transitory computer-readable storage medium and adapted to be executed by a processor for performing the method, comprising:
detecting, at a virtual machine host node, a change in virtual machine status for virtual machines hosted on the host node, the change in virtual machine status including at least one of virtual machine creation, virtual machine cloning, virtual machine destruction, virtual machine suspension, virtual machine pausing, or virtual machine resumption; and
transmitting reports to a server node from the host node, the reports indicating the change in virtual machine status, to enable the server node to allocate or de-allocate the interact protocol (IP) addresses to the virtual machines based on the change in virtual machine status as determined by the reports and at least one policy previously stored in the sever node, the at least one policy including a lifecycle-event based restriction to be used to determine whether to allocate a new IP address to a cloned virtual machine;
wherein the reports comprise: at least one of a status or a change in stares of at least one of the virtual machines, and at least one of a media access control (MAC) address or a universally unique identifier (UUID) of the at least one of the virtual machines.

18. The method of claim 17, further comprising:
registering, using a virtual machine state change notifier module, with a hypervisor operating on the host node to receive the virtual machine status.

19. The method of claim 17, wherein the transmitting comprises:
transmitting the reports from a virtual machine state change notifier module residing on the host node to a virtual machine state change receiver module residing on the server node.

20. The method of claim 17, wherein the transmitting comprises:
transmitting the reports directly from a hypervisor operating on the host node.

21. The method of claim 17, further comprising:
modifying a lease message to include at least one of the reports.

22. The method of claim 17, further comprising:
   installing a Common Information Model (CIM) provider module to couple to a dynamic host configuration protocol (DHCP) client on the host node, the CIM provider module to generate the reports.

23. The apparatus of claim 1, wherein the server node is configured to reject an IP address allocation request coming from a virtual machine hosted on another virtual machine host node.

24. The apparatus of claim 23, wherein the IP address allocation request is rejected based on determining that a first MAC address reported by the other virtual machine host node as being associated with the virtual machine is different from a second MAC address reported by the virtual machine.

* * * * *

UNITED STATES PATENT AND TRADEMARK OFFICE
CERTIFICATE OF CORRECTION

PATENT NO. : 8,966,082 B2  
APPLICATION NO. : 12/368489  
DATED : February 24, 2015  
INVENTOR(S) : Chaturvedi et al.

Page 1 of 1

It is certified that error appears in the above-identified patent and that said Letters Patent is hereby corrected as shown below:

In the claims

In column 8, line 51, in Claim 1, delete "interact" and insert --internet--, therefor In column 9, line 12, in Claim 4, delete "resumption:" and insert --resumption;--, therefor In column 10, line 39, in Claim 17, delete "interact" and insert --internet--, therefor Signed and Sealed this  
Tenth Day of November, 2015

Michelle K. Lee  
*Director of the United States Patent and Trademark Office*